Oct. 22, 1940.                W. S. TORRENCE                2,218,995
                         FISHING ROD WINDING MACHINE
                    Filed Feb. 15, 1939          3 Sheets-Sheet 1
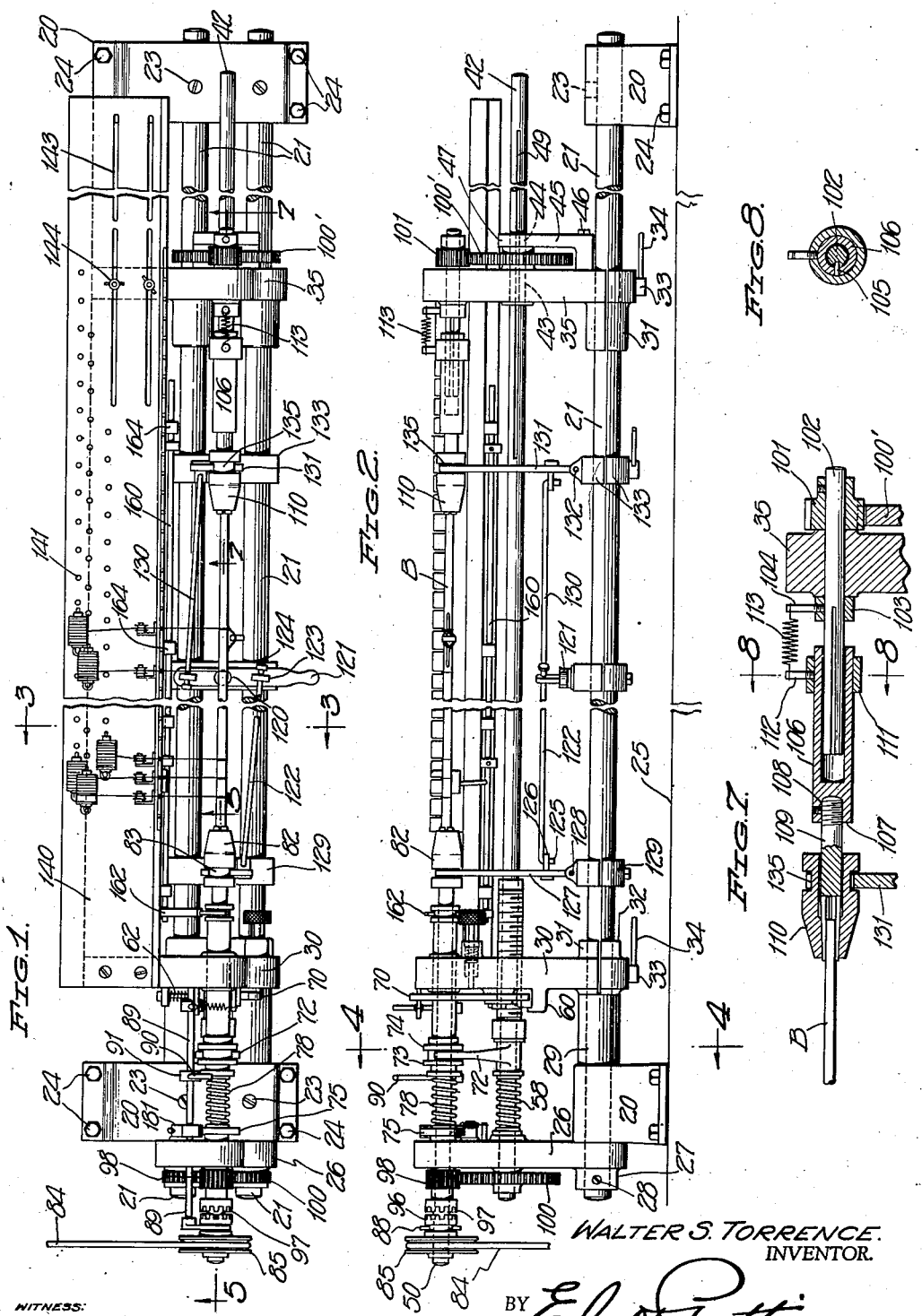
WALTER S. TORRENCE.
INVENTOR.
BY *Ely N. Pattison*
ATTORNEYS.

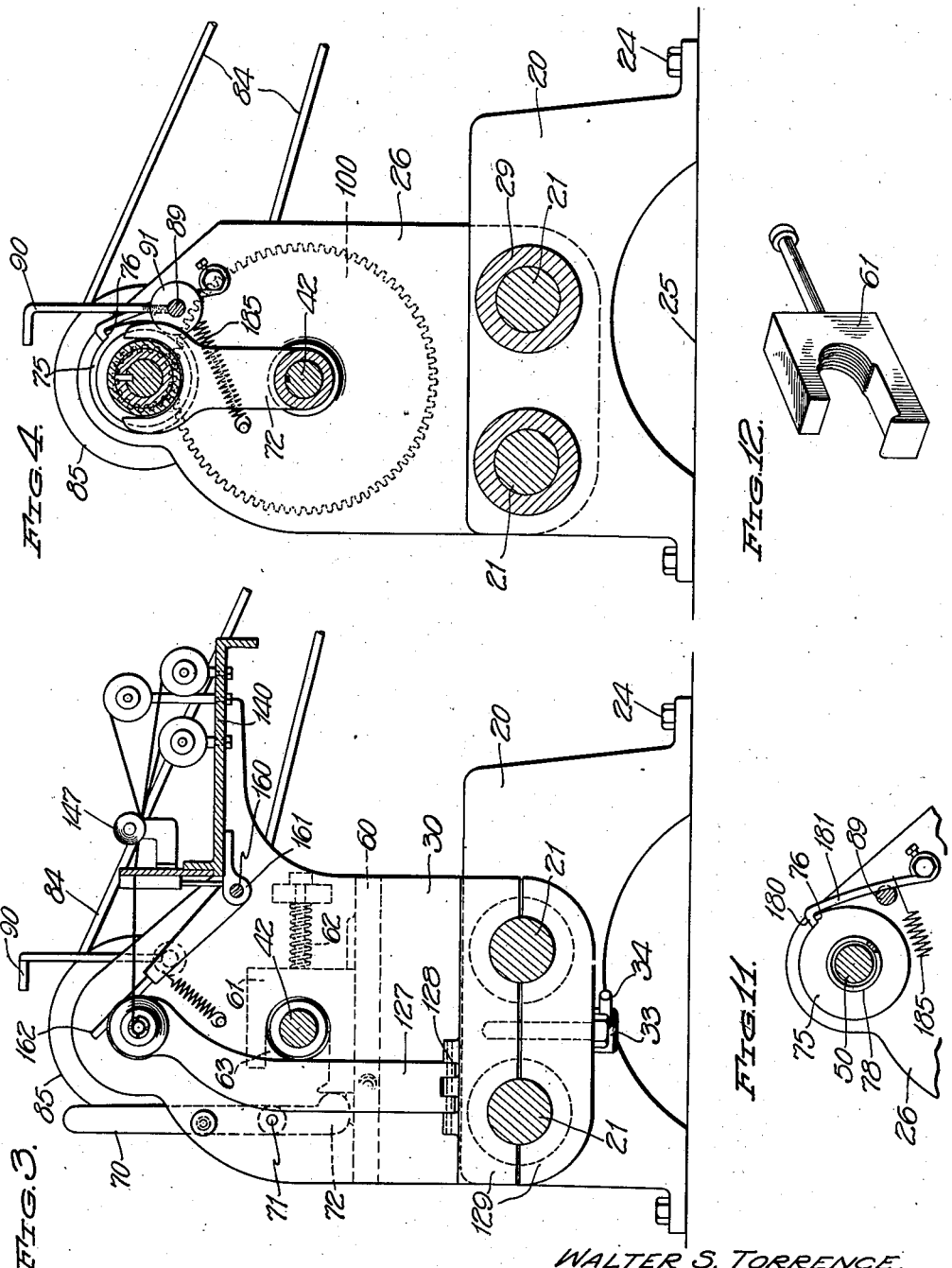

Oct. 22, 1940.    W. S. TORRENCE    2,218,995
FISHING ROD WINDING MACHINE
Filed Feb. 15, 1939    3 Sheets-Sheet 3
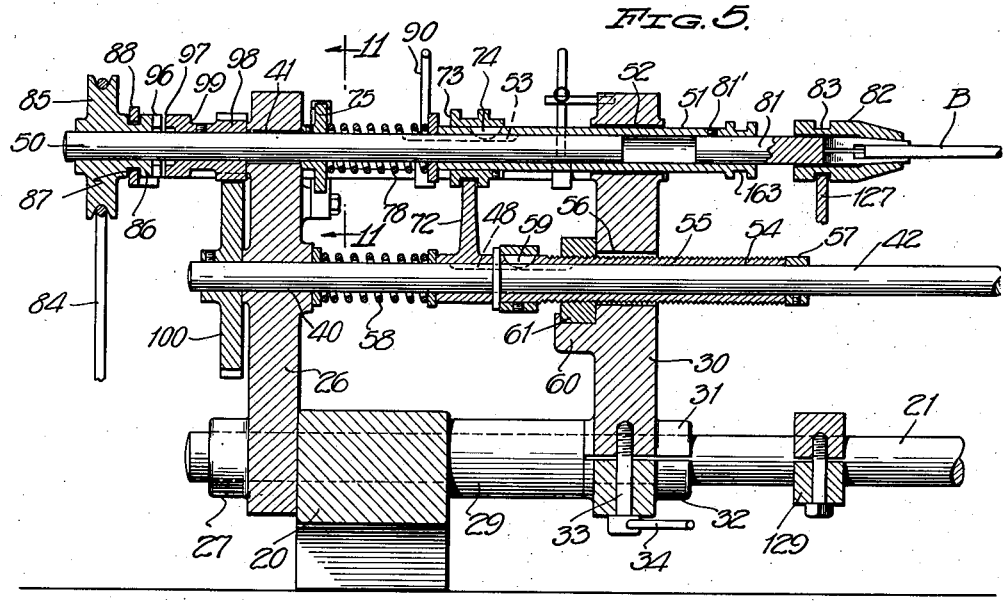
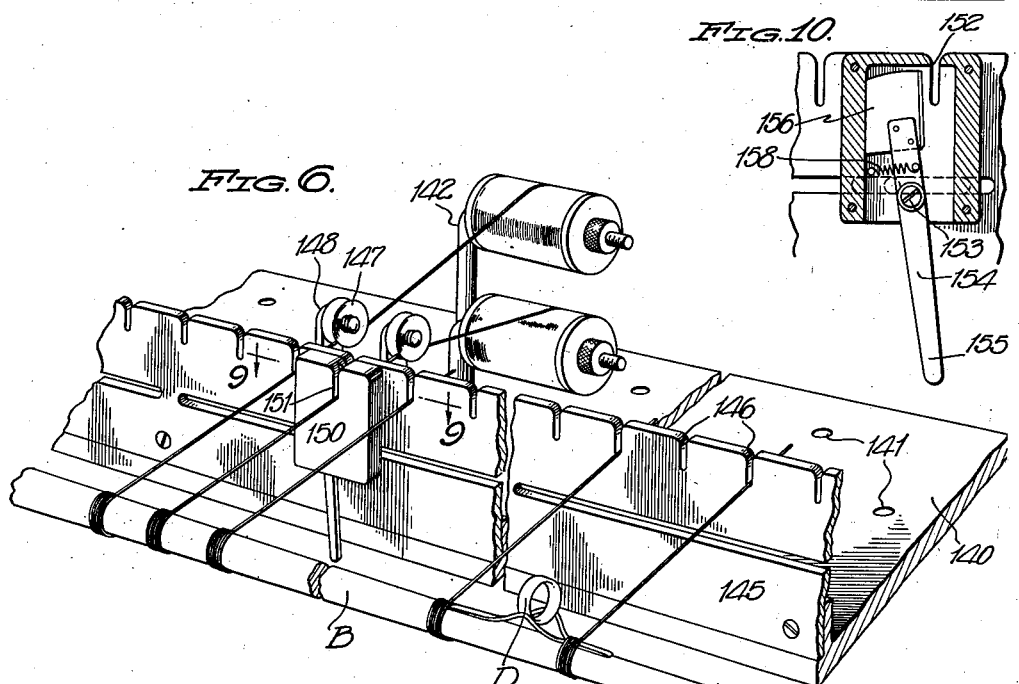
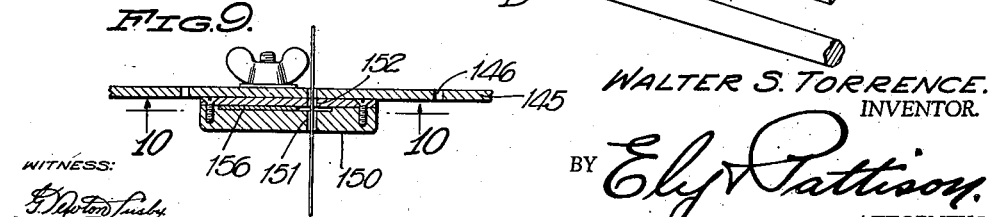
WALTER S. TORRENCE.
INVENTOR.
BY Ely Pattison
ATTORNEYS.

Patented Oct. 22, 1940

2,218,995

UNITED STATES PATENT OFFICE 2,218,995

FISHING ROD WINDING MACHINE

Walter S. Torrence, New York, N. Y.

Application February 15, 1939, Serial No. 256,419

5 Claims. (Cl. 242—7)

This invention relates to new and useful improvements in winding machines and more particularly it pertains to machines for applying binding windings to fishing rods and fishing rod joints.

It is one object of the present invention to improve the construction and mode of operation of machines of the afore-mentioned type, and to provide such machines with mechanism which will effect a better binding operation than will machines of the prior art.

A feature of the invention resides in a novel construction and arrangement of parts whereby rods or sections of rods of various lengths may be operated upon merely by a simple adjustment of the parts of the machine.

A serious difficulty with prior machines has been an inability to prevent whipping or wobbling of the rod during rotation thereof to accomplish the winding of the bindings thereon and it is an object of the present invention so to construct a machine of the afore-mentioned type which will maintain the rod or section of rod being operated upon in true axial alinement during the winding operation.

A further feature of the invention resides in a novel construction and arrangement of parts for simultaneously applying a plurality of binding windings upon a fishing rod or a section thereof.

A further feature of the invention resides in a novel construction whereby the binding windings may be applied to the rod in any desired lengths and the machine automatically brought to a position of rest when the binding windings of the desired length have been applied.

Other features of the invention relate to certain novel and improved construction, arrangements and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

In the drawings,

Figure 1 is a top plan view of a machine for applying binding windings to a fishing rod or section thereof, constructed in accordance with the present invention, Figure 2 is a view in front elevation thereof, Figure 3 is a vertical sectional view taken substantially on the line 3—3 of Figure 1, Figure 4 is a vertical sectional view taken substantially on the line 4—4 of Figure 2, Figure 5 is a longitudinal sectional view taken substantially on the line 5—5 of Figure 1, Figure 6 is a fragmentary perspective view on an enlarged scale, illustrating one of the binding feeding units, the manner in which the binding is fed to the rod or rod section being operated upon, and the binding severing device, Figure 7 is a longitudinal sectional view on an enlarged scale, taken substantially on the line 7—7 of Figure 1.

Figure 8 is a detail sectional view taken on the line 8—8 of Figure 7,

Figure 9 is a detail sectional view taken substantially on the line 9—9 of Figure 6, Figure 10 is a detail vertical sectional view taken substantially on the line 10—10 of Figure 9, Figure 11 is a detail sectional view taken on the line 11—11 of Figure 5, and;

Figure 12 is a detail perspective view of the carriage feeding nut.

Referring to the drawings by reference character, and more particularly to Figure 2, thereof, the machine has a supporting base which preferably consists of two blocks 20 and supporting bars 21, of which there are preferably two. The supporting bars 21 are secured in parallel relation in the blocks 20 by bolts, screws or the like 23, see Figure 1, and these several parts are, of course, rigidly secured together. The blocks 20 may be rigidly or firmly attached as at 24 to a bench, table or other suitable support 25.

Rising from the bars 21 at one end thereof, there is a pillow block or bearing standard 26 which preferably has two tubular extensions 27 through which the supporting rods 21 pass and also through which pass screws or bolts 28 for securing the pillow block or standard 26 against movement relatively to the bars 21.

The pillow block 26 is mounted upon the bars 21 beyond or outside of the adjacent supporting or base block 20, and mounted upon each of the bars 21 upon the inside of the adjacent supporting blocks 20, there is a sleeve 29.

The reference character 30 designates a second pillow block or bearing standard which has two saddle-like bearings 31 which rest upon the bars 21 and form the support for this pillow block. A clamping plate 32 is employed to secure the pillow block 26 in clamped rigid engagement with the bars 21, a quick-acting bolt 33 operated by a handle 34, being preferably employed between the bars 21 as more clearly illustrated in Figure 3 of the drawings.

A third pillow block or bearing standard 35 is mounted upon the bars 21 adjacent the other end thereof, this pillow block being carried by and attached to the bars 21 in the same manner as that described for the pillow block 30, and will, therefore, not be specifically described.

The blocks 20, bars 21 and pillow blocks 26, 30 and 35 when secured together as above described, constitute a rigid frame work for the several movable parts which will now be described in detail.

As best illustrated in Figure 5, the pillow block 26 is provided with two bearings 40 and 41 and mounted at one end in the bearing 40, there is a shaft 42. The shaft also rests near its other end in a bearing 43, in the pillow block 35 and in a bearing 44 in a bracket 45 which is secured to the pillow block 35 at 46. This bracket 45 has a vertical arm 47, which as shown in Figure 2, is spaced with respect to the pillow block 35. The shaft 42 has two keyways 48 and 49, the specific purpose of which will be hereinafter more specifically set forth.

Mounted in the bearing 41 of the pillow block 26, there is a second shaft 50, the inner end of which is supported within a sleeve 51, which in turn operates in a bearing 52 in the pillow block 30 and this shaft is provided with a keyway 53.

Carried by the shaft 42, there is a sleeve 54, the exterior of which is threaded as at 55, and this sleeve extends through an opening 56 in the pillow block 30. The inner end of this sleeve 54 abuts a collar 57, secured to the shaft 42 and interposed between the outer end of said sleeve and the pillow block 26, there is a coil spring 58 which is under tension urging the threaded sleeve 54 in the direction of the collar 57. The threaded sleeve 54 is operatively connected to the shaft 42, by means of a key 59 which passes through the sleeve and has sliding engagement in the keyway 48 heretofore mentioned.

The pillow block 30 is provided with a trackway 60 in which is slidably mounted a nut 61. The thread of the nut interengages the thread 55 of the sleeve 54 and is normally urged into such engagement by a spring 62, see figure 3. The nut 61 has an open side 63 which permits of its movement over the sleeve 54, to positions in engagement with and out of engagement with the thread 55 of the sleeve 54.

The nut is urged into engagement with the thread 55 of the sleeve 54 by the spring 62 as heretofore stated and for moving the nut out of engagement with said thread, there is a hand-operated lever 70. This lever 70 is pivotally mounted as at 71 upon the pillow block 30 and its lower end engages the nut 61 in such a manner that when the lever is rocked to the left in Figure 3, the nut 61 will be moved to the right in Figure 3 and disengage the thread of the sleeve 54. Upon release of the hand lever 70, the spring 62, returns the parts to the position shown in Figure 3, in which position the nut is in engagement with the thread 55 of the sleeve 54.

Mounted upon the shaft 42 in such a manner that the shaft is free to rotate therein, there is an arm 72, the upper end of which is forked to embrace a collar 73, which collar 73 has a key 74 which passes through the sleeve 51 and has sliding engagement with the keyway 53 in the shaft 50.

The reference character 75 designates a disk-like member which has a shoulder 76 upon its periphery. This disk-like member is secured to the shaft 50 closely adjacent the pillow block 26 and interposed between it and the outer end of the sleeve 51, there is a coil spring 78, which urges the sleeve to the right in Figure 5.

By this construction, it will be apparent that as the shaft 42 is rotated, the sleeve 54 will likewise be rotated, and through the medium of its threaded engagement with the nut 61, the sleeve 54 will be moved to the left in Figure 5 against the action of the spring 58. Movement of the sleeve 54 to the left in Figure 5 moves the arm 72 to the left in said figure, which in turn, moves the upper sleeve 51 to the left in Figure 5, sliding the same along the shaft 50 against the action of the spring 78, placing said spring under compression.

A stub shaft 81 is secured as at 81' in the free end of the sleeve 51 and carried by the stub shaft 81, there is a conventional chuck 82, which is adapted to grip one end of a rod or section of rod designated B. The chuck 82 has an annular groove 83, the purpose of which will be hereinafter described.

The shaft 42 is rotated in the following manner:

The reference character 84 designates a driving belt which passes around a driving pulley 85 freely rotatable upon the shaft 50. The pulley 85 has a hub extension 86 provided with a groove 87, in which a forked member 88 rides. The forked member 88 is carried by a rod 89 slidably mounted in the pillow blocks 26 and 30, see Figure 5. The rod 89 is reciprocated both manually and automatically, in the following manner:

The reference numeral 90 designates an operating handle which has threaded engagement with a disk-like member 91, and the inner end of the handle 90, engages the rod 89, to lock the member 91 thereto in any position along the rod to which it may be adjusted. Thus, merely by grasping the operating handle 90, and moving it to the right or to the left, the rod 89 will be moved correspondingly.

The rod 89 is moved automatically in the following manner:

By reference to Figure 4, it will be noted that the disk-like member 91 is in the path of travel of the forked arm 72 so that when it moves to the left as shown in Figure 1 in the manner heretofore described, it engages the disk-like member 91, moving it to the left and consequently moving the rod 89 to the left.

The hub extension 86 of the pulley 85 has a clutch face 96, which is adapted, as the rod 89 is moved, to engage and disengage a clutch face 97 upon the extension 99 of a gear 98. The gear 98 is secured to the shaft 50 and hence when the clutch faces 96 and 97 operatively engage each other, the gear 98 and the shaft 50 will be rotated.

The gear 98 meshes with a gear 100 operatively connected with the shaft 42 so that when the gear 100 is rotated by the gear 98, said shaft 42 will be driven to rotate the threaded sleeve 54 in the nut 61, rotated by reason of the fact that the gear 98 is operatively connected thereto, while the threaded sleeve 54 will be rotated by reason of the key 50 operating in the keyway 48 in the shaft 42 in the manner heretofore described.

Mounted upon the shaft 42 between the pillow block 35 and the bracket 45, there is a gear 100' which gear has a key not shown which operates in the keyway 49 to operatively connect the gear to the shaft and yet permit of sliding movement therealong. The gear 100' meshes with a gear 101, operatively connected to a short shaft 102 which is mounted in the upper portion of the pillow block 35. A collar 103, secured to the shaft 102 by a bolt 104 serves together with the gear 101, to maintain the shaft 102 in position.

Slidably mounted upon the shaft 102, but keyed thereto as at 105, see Figures 7 and 8, there is a sleeve 106 which has a closed end 107, formed with a socket 108. Secured in the socket 108 there is a shaft 109 which carries a chuck 110 which grips the opposite end of the rod or section of rod B, being operated upon.

From the foregoing, it will be readily apparent that the rod or section of the rod being operated upon is supported in operative position by the two chucks 82 and 110 and that rotary motion is transmitted thereto by said chucks which are rotated in unison in the manner heretofore described.

Means is provided to maintain the rod or section of rod being operated upon in true longitudinal alinement and to thereby prevent whipping thereof and this means will now be described.

As heretofore stated, the sleeve 106 is slidably mounted upon the shaft 102 and this sleeve carries a collar 111 from which projects a bolt 112. Connecting the bolt 112 with the bolt 104, heretofore mentioned, there is a spring 113. The tension of this spring will, at all times, be sufficient enough pull upon the sleeve 106, which pull is in turn transmitted to the rod B, to maintain said rod in true longitudinal alinement and prevent whipping thereof. It will be understood that the spring 113 is placed under tension by the pulling of the rod upon the sleeve 106 through the medium of the shaft 109 and the chuck 110, since the rod is moved to the left in the figures by the feed screw 54, which moves the arm 72 and the sleeve 51, during a winding operation.

To provide for rods or sections of rods of different lengths, the pillow block 35 is adjustable along the supporting frame by loosening of the quick-acting bolt 33.

The chucks 82 and 110 which support the rod being operated upon are operated simultaneously to grip or release a rod and the means by which this is accomplished will now be described.

Pivotally mounted as at 120 upon the supporting frame, there is a hand lever 121. Connected to the hand lever on the side forward of the pivot 120, there is a rod or link 122 which has sliding movement in the eye of a lug 123 mounted on the hand lever. This link 122 has a head 124 so that in one direction of movement of the hand lever, the rod will be moved by engagement of the lug 123 with the head 124, while, when, as shown in Figure 1, the hand lever 121 is in its normal position, the head 124 is slightly spaced therefrom to allow limited free movement of the rod in the lug 123.

The opposite end of the link 122 has a hooked end 125 which engages in an opening in a lug 126, carried by a lever 127 which is pivotally mounted as at 128 upon a frame clamping member 129, see Figures 2 and 3.

Similarly connected to the hand lever 121 at a point at the rear of the pivot 120, there is a link 130, the other end of which is connected, in a manner similar to the link 122, to a lever 131 which is pivotally mounted as at 132 to a frame clamping member 133.

The lever 127 has a forked upper end which embraces the chuck 82 and operates in the groove 83 therein and the lever 131 has a similarly forked upper end which embraces the chuck 110 and operates in a groove 135 in said chuck.

Thus it will be apparent that when the lever is moved in one direction from its normal position, the chucks 82 and 110 will be moved away from each other in order that the ends of a rod to be operated upon may be positioned to be gripped by the chucks which are tightened in engagement therewith, after of course, the chucks have been moved towards each other by the return of the hand lever to its normal position in which it is shown in Figure 1.

The grooves 83 and 135 in the chucks 32 and 110, are of such width as to permit of sufficient independent movement of the chucks under the influence of the spring 113 in order that the rod may be under constant longitudinal pull or strain in the manner heretofore described, which action is also aided by the lost motion afforded by the sliding connection of the links 122 and 130, with the hand lever 121. The hooked ends of the links 122 and 130 permit of their ready removal and the substitution of links of different lengths depending upon the length of rod or section of rod being operated upon.

Supported upon the pillow blocks 30 and 35 and positioned at the rear of the machine, there is a shelf 140 which is provided with a plurality of openings 141 for the reception of spool supports 142. This shelf is also provided with longitudinally extending slots 143 which receive bolts 144 carried by the pillow block 35, which construction permits of ready adjustment of the pillow block 35 relatively to the shelf 140.

As best illustrated in Figure 6, there is an upstanding flange 145, the upper edge of which is formed with a plurality of guide slots 146 through which the bindings may be led from the spools to the rod or section of rod being operated upon. The reference character 147 designates tension devices which may be of any conventional type and which are adjustably mounted by means of standards 148 which may be secured in the proper openings 141 heretofore mentioned.

The reference numeral 150 designates a binding cutter of which, although but one is shown in Figure 6, there may be one for each binding if desired.

These binding cutters each comprises a housing having slots 151 and 152 respectively in its front and rear walls through which the binding passes. Pivotally mounted in the housing as at 153, there is a lever 154 having a depending extension 155 while upon the upper end of the lever 154 there is a cutter blade 156.

In Figure 10 the parts of the cutter are illustrated in their normal position in which position they are held by a coil spring 158, connected at one end to the housing and at the other end to the pivoted lever 154. By rocking the lever 154 about its pivotal point 153, the cutting blade 156 may be moved across the guide slot 152 in the rear wall of the housing to sever the binding and the parts will be returned to and held in their normal position after a cutting operation by the spring 158.

Means is provided for automatically operating the cutters 150 and this means includes a reciprocable rod 160, slidably mounted in brackets 161 upon the under side of the shelf 140, see Figure 3. This rod 160 carries an arm 162 which rests in a groove 163 on the sleeve 51, see Figure 5. The rod 160 carries a plurality of adjustable blocks 164 which occupy positions such that they will, as the rod is reciprocated, engage the depending ends of the cutter levers 154 to rock the levers about their respective pivotal points to effect a cutting operation of the bindings.

It is to be understood that the rod 160 is reciprocated by the lever 162 resting in the groove 163 of the sleeve 51, when said sleeve is moved by the feeding screw 54 and the springs 58 and 78.

The machine operates in the following manner:

A rod or section of a rod to be wound with binding is placed in the chucks 82 and 110 by first spreading the chucks by the hand lever in the manner heretofore described. After the rod has been placed in position, the binding threads are led through their proper guide slots and their free ends attached to the rod preferably by means of a quick drying adhesive, as is the practice in the art.

When the rod has been so positioned and the free ends of the bindings secured thereto, the hand lever 90 is grasped and moved to the right in Figure 1 of the drawings which action moves the rod 89 also to the right to engage the clutch faces 96 and 97, to drive the shaft 50, and rotate the rod held in the chucks.

Upon rotation of the shaft 50, the sleeve 54 will be moved to the left in the drawings by the feeding nut 61 moving the arm 72 and the sleeve 51 to the left and thereby moving the rod longitudinally and relatively to the binding threads or windings in order to lay them upon the rod. The chuck 110 is moved to the left against the action of the spring 113, by the rod B and it is to be understood that the tension produced by this pull will be sufficient to maintain the rod being operated upon in true longitudinal alinement against both the tension of the binding threads and any tendency of the rod to whip as a result of the speed at which it is operated.

This tension resulting from the longitudinal pull upon the rod, I consider an important feature of my invention, since it permits of the winding of rods of high flexibility in a true and even manner without damage to the rod, thereby permitting the use of the machine for winding fly rods and fly rod tips.

As the machine continues to operate, the arm 72 engages the member 91 and moves the rod 89 to the left to disengage the clutch faces 96 and 97 and disconnect the power from the shaft 50. It will be obvious that by adjustment of the hand lever 90 along the rod 89, the length of the bindings may be varied as desired.

When the power is disconnected from the shaft 50, the shaft will be brought to rest in a predetermined position by reason of the engagement with the shoulder 76 of the member 75, by the hooked end 180 of a spring actuated lever 181, see Figure 11. The rod 89 is cut away as indicated in dotted lines in said Figure 11, to provide a low spot which permits of the rocking of the lever under the influence of the spring 185. The low spot in the rod 89 is so positioned with respect to the lever 181 that it registers therewith just at the time that the clutch faces become disengaged so that as the shoulder 76 comes around the next time, the hooked end of the lever 181 will engage it to arrest further rotation of the shaft. This is another important feature of this invention, since it insures the rod stopping in a position in which guides such as D in Figure 6, will come to rest in an uppermost position.

Just as the rod comes to rest, the cutters are operated as heretofore described to sever the binding threads in the manner heretofore described and a suitable adhesive is applied to secure the loose ends thereof to the rod.

After the bindings have been secured upon the rod, the rod is removed and the lever 70 is operated to move the nut 61 out of engagement with the thread 55 of the sleeve 54, whereupon the several parts are returned to their starting position under the influence of the springs 58 and 78 ready to receive another rod or length of rod to repeat the operation.

From the foregoing, it will be apparent that the present invention provides a novel machine for applying binding windings to fishing rods and rod sections which machine is capable of applying any number and length of bindings desired. Furthermore, the machine is, except for the placing of the rod in operative position and starting of the machine, practically automatic in its operation.

While the invention has been herein disclosed in a preferred form, it is to be understood that it is not to be limited to the specific construction herein shown, and that it may be carried out with slight changes within the scope of the appended claims.

Having thus described the invention what is claimed as new, is:

1. In a machine of the character described, in combination, a pair of spaced chucks for supporting a rod to be operated upon, means for rotating said chucks in unison, means for simultaneously opening and closing said chucks, and means for exerting a constant pull upon one of said chucks to maintain the rod being operated upon, in axial alinement with the axes of the chucks.

2. In a machine of the character described, in combination, a pair of spaced chucks in axial alinement with each other for supporting a rod to be operated upon, means for simultaneously rotating said chucks in the same direction at equal rates of speed, means for simultaneously moving said chucks in one direction through the medium of a rod supported in said chucks, and resilient means exerting a constant pull upon one of said chucks in a direction opposite to the direction of their simultaneous movement to maintain the rod being operated upon, in axial alinement with the axes of said spaced chucks.

3. In a machine of the character described, in combination, a base, a plurality of winding strands supported upon said base, means mounted upon said base for supporting a rod to be operated upon in operative relation with said plurality of winding strands, means for rotating the rod and for simultaneously moving it relatively to the winding strands to effect a laying of the winding strands thereon, tensioning means for said winding strands, and means for exerting sufficient pull longitudinally of the rod being operated upon, to retain the rod in true axial alinement against the tension of the winding strands.

4. In a machine of the character described, in combination, a base, a plurality of winding strands supported upon said base, means mounted upon said base for supporting a rod to be operated upon in operative relation with said plurality of winding strands, means for rotating the rod and for simultaneously moving it relatively to the winding strands to effect a laying of the winding strands thereon, tensioning means for said winding strands, and means for exerting sufficient pull longitudinally of the rod being operated upon, to retain the rod in true axial alinement against the tension of the winding strands, said last mentioned means including one of the rod supporting means.

5. A machine for applying binding windings to areas of fishing rods, said machine comprising a supporting base, a pair of pillow blocks carried by one end of the supporting base, one of said pillow blocks being adjustable along the base, a third pillow block carried upon the other end of the supporting base and adjustable therealong, a shaft mounted in said first-mentioned pillow blocks, means for rotating said shaft, a sleeve carried by said shaft, said sleeve being slidable upon said shaft and rotatable therewith, positive operating means for sliding the sleeve upon the shaft, a rod gripping and supporting chuck carried by the sleeve, said chuck being rotatable and slidable with said sleeve, a shaft mounted in said third pillow block, means for rotating said shaft, a sleeve slidable upon said shaft and keyed thereto to rotate therewith, a rod gripping and supporting chuck carried by said sleeve, and means for urging said sleeve in a direction opposite to the sliding movement imparted to the first mentioned sleeve by the positive operating means.

WALTER S. TORRENCE.